(12) United States Patent
Teague et al.

(10) Patent No.: US 12,546,206 B2
(45) Date of Patent: Feb. 10, 2026

(54) METHODS AND MEANS FOR THE MEASUREMENT OF TUBING, CASING, PERFORATION AND SAND-SCREEN IMAGING USING BACKSCATTERED X-RAY RADIATION IN A WELLBORE ENVIRONMENT

(71) Applicants: Philip Teague, Spring, TX (US); Melissa Spannuth, Houston, TX (US); Alex Stewart, San Francisco, CA (US); Teresa Tutt, Houston, TX (US)

(72) Inventors: Philip Teague, Spring, TX (US); Melissa Spannuth, Houston, TX (US); Alex Stewart, San Francisco, CA (US); Teresa Tutt, Houston, TX (US)

(73) Assignee: Visuray Intech Ltd, Road Town (VG)

( * ) Notice: Subject to any disclaimer, the term of this patent is extended or adjusted under 35 U.S.C. 154(b) by 0 days.

(21) Appl. No.: 18/220,930

(22) Filed: Jul. 12, 2023

(65) Prior Publication Data
US 2023/0392491 A1 Dec. 7, 2023

Related U.S. Application Data

(63) Continuation of application No. 17/689,526, filed on Mar. 8, 2022, now abandoned, which is a (Continued)

(51) Int. Cl.
*G01V 1/50* (2006.01)
*E21B 47/002* (2012.01)
(Continued)

(52) U.S. Cl.
CPC ........ *E21B 47/0025* (2020.05); *E21B 47/002* (2020.05); *E21B 47/005* (2020.05);
(Continued)

(58) Field of Classification Search
CPC .. E21B 47/0025; E21B 47/002; E21B 47/005; E21B 47/085; G01N 23/203;
(Continued)

(56) References Cited

U.S. PATENT DOCUMENTS 10,253,618 B2 * 4/2019 Safinya ................ E21B 47/092

* cited by examiner

*Primary Examiner* — Kiho Kim
(74) *Attorney, Agent, or Firm* — Adams & Reese LLP; John Henry Scott, III

(57) ABSTRACT

An x-ray-based cased wellbore tubing and casing imaging tool is disclosed, the tool including at least a shield to define the output form of the produced x-rays; a two-dimensional per-pixel collimated imaging detector array; a parallel hole collimator format in one direction that is formed as a pinhole in another direction; Sonde-dependent electronics; and a plurality of tool logic electronics and PSUs. A method of using an x-ray-based cased wellbore tubing and casing imaging tool is also disclosed, the method including at least: producing x-rays in a shaped output; measuring the intensity of backscatter x-rays returning from materials surrounding a wellbore; determining an inner and an outer diameter of tubing or casing from the backscatter x-rays; and converting image data from said detectors into consolidated images of the tubing or casing.

26 Claims, 5 Drawing Sheets

Related U.S. Application Data continuation of application No. 17/030,970, filed on Sep. 24, 2020, now abandoned, which is a continuation of application No. 16/290,360, filed on Mar. 1, 2019, now abandoned.

(60) Provisional application No. 62/636,907, filed on Mar. 1, 2018.

(51) Int. Cl.
*E21B 47/005* (2012.01)
*E21B 47/085* (2012.01)
*G01N 23/203* (2006.01)
*G01V 5/12* (2006.01)

(52) U.S. Cl.
CPC ......... *E21B 47/085* (2020.05); *G01N 23/203* (2013.01); *G01V 1/50* (2013.01); *G01V 5/12* (2013.01); *G01N 2223/316* (2013.01); *G01N 2223/616* (2013.01)

(58) Field of Classification Search
CPC ....... G01N 2223/316; G01N 2223/616; G01V 1/50; G01V 5/12; G01V 5/222
See application file for complete search history.

METHODS AND MEANS FOR THE MEASUREMENT OF TUBING, CASING, PERFORATION AND SAND-SCREEN IMAGING USING BACKSCATTERED X-RAY RADIATION IN A WELLBORE ENVIRONMENT

CROSS-REFERENCES TO RELATED APPLICATIONS

This patent application claims benefit of U.S. patent application Ser. No. 17/689,526, filed Mar. 8, 2022, which claims benefit of U.S. patent application Ser. No. 17/030,970, filed Sep. 24, 2020, which claims benefit of U.S. patent application Ser. No. 16/290,360, filed Mar. 1, 2019, which claims the benefit of U.S. Provisional Patent Application No. 62/636,907, filed Mar. 1, 2018, the contents of which are hereby incorporated by reference in their entirety.

TECHNICAL FIELD

The present invention relates generally to methods and means for monitoring and determining tubing, casing, and sand-screen integrity, in addition to casing perforation size, form, and distribution.

BACKGROUND

Within the oil & gas industry, the requirement to gauge the quality of tubing is paramount. The industry currently employs various methods for the verification of the quality of the casing. Typically, calipers or cameras are employed to determine whether the casing/tubing is cylindrical and or not-corroded. However, cameras require the wellbore to contain optically clear fluids; otherwise they are incapable of distinguishing features within the fluid or borehole. More recently, ultra-sonic tools have been run within the well in an attempt to image the casing or tubing, or elements outside of the tubing such as the parts of a downhole safety valve. However, ultrasonic tools are model dependent, so prior knowledge of the precise makeup and status of the well is typically required for the ultrasound data comparison purposes.

No viable technologies are currently available that use a method or means to employ a combination of collimators, located cylindrically around an X-ray source, located within a non-padded concentrically-located borehole logging tool, together with a plurality of three-dimensional per-pixel collimated imaging detector array(s) to also be used as the primary imaging detector(s), to produce complete backscatter images of the casing/tubing, in addition to being able to accurately measure the inner-diameter and outer-diameter of the tubing, even in the presence of scale deposits.

Prior art teaches a variety of techniques that use x-rays or other radiant energy to inspect or obtain information about the structures within or surrounding the borehole of a water, oil or gas well, yet none teach of a method to use the first order detectors (that are typically used to compensate for mud-cake/fluid variations) to create a photograph-like image of the casing itself.

US20190063209 to Teague teaches an x-ray-based cement evaluation tool for determining whether a cement bond exists between the casing and cement of a cemented borehole, the tool including at least: an internal length comprising a Sonde section, wherein said Sonde section further comprises an x-ray source; a radiation shield for radiation measuring detectors; arrayed pixelated detectors; Sonde-dependent electronics; and a plurality of tool logic electronics and PSUs.

US20190049621 to Teague et al teaches an x-ray based cement evaluation tool for measurement of the density of material volumes within single, dual and multiple-casing wellbore environments, wherein the tool uses x-rays to illuminate the formation surrounding a borehole, and a plurality of detectors are used to directly measure the density of the cement annuli and any variations in density within. The tool uses x-rays to illuminate the casing surrounding a borehole and a plurality of multi-pixel imaging detectors directly measures the thickness of the casing.

US20190048709 to Teague et al teaches an x-ray-based cased wellbore environment imaging tool, the tool including at least an x-ray source; a radiation shield to define the output form of the produced x-rays; a direction controllable two-dimensional per-pixel collimated imaging detector array; Sonde-dependent electronics; and a plurality of tool logic electronics and PSUs.

U.S. Pat. No. 7,675,029 to Teague teaches an apparatus that permits the measurement of x-ray backscattered photons from any horizontal surface inside of a borehole that refers to two-dimensional imaging techniques.

U.S. Pat. No. 7,705,294 to Teague teaches an apparatus that aims to measure backscattered x-rays from the inner layers of a borehole in selected radial directions with the missing segment data being populated through movement of the apparatus through the borehole. The apparatus permits generation of data for a two-dimensional reconstruction of the well or borehole, but the publication does not teach of the necessary geometry for the illuminating x-ray beam to permit discrimination of the depth from which the backscattered photons originated, only their direction. It also fails to teach of a method or means that can be employed to create a helical ribbon image, or a cylindrical image while stationary. Optimally, the tool is constantly moving so as to recreate tessellated sections of an image, rather than an azimuthally scanning image that is generally independent of hole size/geometry.

U.S. Pat. No. 8,481,919 to Teague 2012 teaches a method of producing Compton-spectrum radiation in a borehole without the use of radioactive isotopes, and further describes rotating collimators around a fixed source installed internally to the apparatus, but does not have solid-state detectors with collimators. It further teaches of the use of conical and radially symmetrical anode arrangements to permit the production of panoramic x-ray radiation.

U.S. Pat. No. 3,564,251 to Youmans discloses the use of a azimuthally scanning collimated x-ray beam that is used to produce an attenuated signal at a detector for the purposes of producing a spiral-formed log of the inside of a casing or borehole surface immediately surrounding the tool, effectively embodied as an x-ray caliper. The reference, however, fails to teach of a means or method to create a photo-like image, other than a two-dimensional radial plot on an oscilloscope.

U.S. Pat. No. 7,634,059 to Wraight discloses a concept that may be used to produce individual two-dimensional x-ray images of the inner surface inside of a borehole using a single pin-hole camera without the technical possibility to ascertain the azimuth of the image being taken, such that a tessellation/stitching of multiple images is not taught. In addition, it fails to provide a method that could be used to log (i.e., actively move) the tool axially, such that, a consolidated image of the inside of the casing may be created.

US2013/0009049 to Smaardyk discloses a concept that allows measurement of backscattered x-rays from the inner layers of a borehole. However, the reference fails to disclose a means or method to create photo-like two dimensional images of the inner surfaces of the casing, while the tool is being axially moved ('logged') through the wellbore, such that a consolidated two dimensional image of the well casing can be produced.

U.S. Pat. No. 8,138,471 to Shedlock discloses a scanning-beam apparatus based on an x-ray source, a rotatable x-ray beam collimator and solid-state radiation detectors enabling the imaging of only the inner surfaces of borehole casings and pipelines. However, the reference fails to teach or suggest a means or method to create photo-like two dimensional images of the inner surfaces of the casing, while the tool is being axially moved ('logged') through the wellbore, such that a consolidated two dimensional image of the well casing can be produced. It also fails to teach or suggest a method and means that uses a fixed conical/panoramic beam to illuminate the well casing, whereas the directional collimation is located at the rotating detector.

U.S. Pat. No. 5,326,970 to Bayless discloses a tool that aims to measure backscattered x-rays azimuthally in a single direction to measure formation density, with the x-ray source being based on a linear accelerator. However, the reference fails to disclose a means or method to create photo-like two dimensional images of the inner surfaces of the casing, while the tool is being axially moved through the wellbore, such that a consolidated two dimensional image of the well casing can be produced.

U.S. Pat. No. 5,081,611 to Hornby discloses a method of back projection to determine acoustic physical parameters of the earth formation longitudinally along the borehole using a single ultrasonic transducer and a number of receivers, which are distributed along the primary axis of the tool.

U.S. Pat. No. 6,725,161 to Hillis discloses a method of placing a transmitter in a borehole, and a receiver on the surface of the earth, or a receiver in a borehole and a transmitter on the surface of the earth, with the aim to determine structural information regarding the geological materials between the transmitter and receiver.

U.S. Pat. No. 6,876,721 to Siddiqui discloses a method to correlate information taken from a core-sample with information from a borehole density log. The core-sample information is derived from a CT scan of the core-sample, whereby the x-ray source and detectors are located on the outside of the sample, and thereby configured as an outside-looking-in arrangement. Various kinds of information from the CT scan such as its bulk density is compared to and correlated with the log information.

U.S. Pat. No. 4,464,569 to Flaum discloses a method to determine the elemental composition of earth formations surrounding a well borehole by processing the detected neutron capture gamma radiation emanating from the earth formation after neutron irradiation of the earth formation by a neutron spectroscopy logging tool.

U.S. Pat. No. 4,433,240 to Seeman discloses a borehole logging tool that detects natural radiation from the rock of the formation and logs said information so that it may be represented in an intensity versus depth plot format.

U.S. Pat. No. 3,976,879 to Turcotte discloses a borehole logging tool that detects and records the backscattered radiation from the formation surrounding the borehole by means of a pulsed electromagnetic energy or photon source, so that characteristic information may be represented in an intensity versus depth plot format.

U.S. Pat. No. 6,078,867 to Plumb discloses a method for generating a three-dimensional graphical representation of a borehole, comprising the steps of: receiving caliper data relating to the borehole, generating a three-dimensional wire mesh model of the borehole from the caliper data, and color mapping the three-dimensional wire mesh model from the caliper data based on either borehole form, rigosity and/or lithology.

SUMMARY

An x-ray-based cased wellbore tubing and casing imaging tool is provided, the tool including at least a shield to define the output form of the produced x-rays; a two-dimensional per-pixel collimated imaging detector array; a parallel hole collimator format in one direction that is formed as a pinhole in another direction; Sonde-dependent electronics; and a plurality of tool logic electronics and PSUs.

A method of using an x-ray-based cased wellbore tubing and casing imaging tool is also provided, the method including at least: producing x-rays in a shaped output; measuring the intensity of backscatter x-rays returning from materials surrounding a wellbore; determining an inner and an outer diameter of tubing or casing from the backscatter x-rays; and converting image data from the detectors into consolidated images of the tubing or casing.

BRIEF DESCRIPTION OF SEVERAL EXAMPLE EMBODIMENTS

Various methods and means for performing casing and tubing integrity evaluation are disclosed which, while simultaneously imaging equipment/features located immediately surrounding the borehole, using x-ray backscatter imaging in a cased wellbore environment, do not require direct physical contact with the well casings (i.e., non-padded). The methods and means herein further consist employing a combination of collimators, located cylindrically around an X-ray source, located within a non-padded concentrically-located borehole logging tool, together with a plurality of fixed three-dimensional hybrid collimated imaging detector array(s) to also be used as the primary imaging detector(s). The ability to control the solid angle of the collimated source permits the operator to either log the tool through the well casing while the detectors measure the inner diameter and outer diameter of tubing or casing, to produce a fully azimuthal two dimensional backscatter x-ray image, and to hold the tool stationary as the collimated detectors image azimuthally to capture a cylindrical image that can be improved upon 'statically' (as the detector continues to recapture casing images that can be added to the existing image set).

Figure 1:
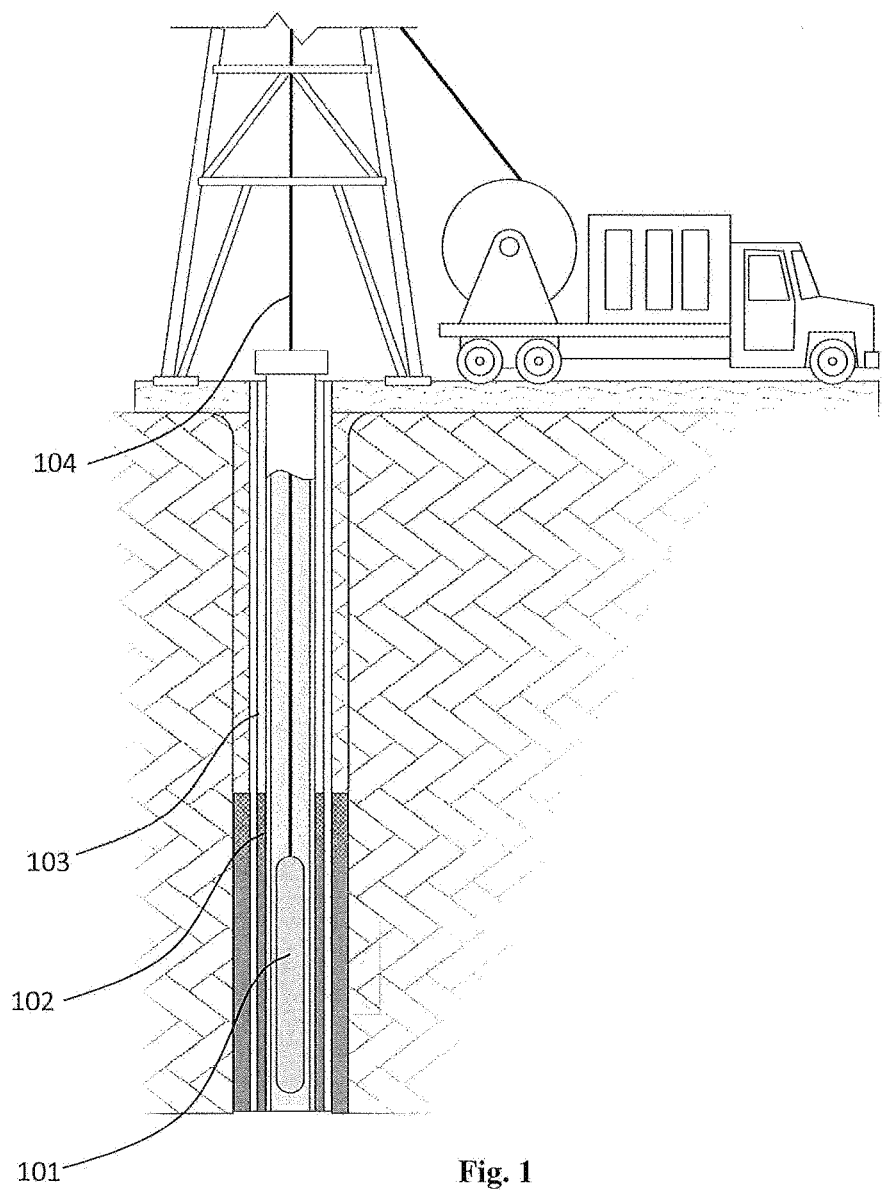
FIG. 1 illustrates an x-ray-based tubing, casing, perforation, or side-pocket mandrel imaging tool being deployed into a borehole via wireline conveyance. Regions of interest within the materials surrounding the borehole are also indicated.

In one example embodiment, and, with reference now to the illustration provided in FIG. 1, an x-ray-based tubing imaging tool [101] is deployed by wireline conveyance [104] into a tubing [102] within a cased [103] borehole, wherein the well casing or tubing [102] is imaged. The tool is enclosed by a pressure housing [201] which ensures that well fluids are maintained outside of the housing.

Figure 2:
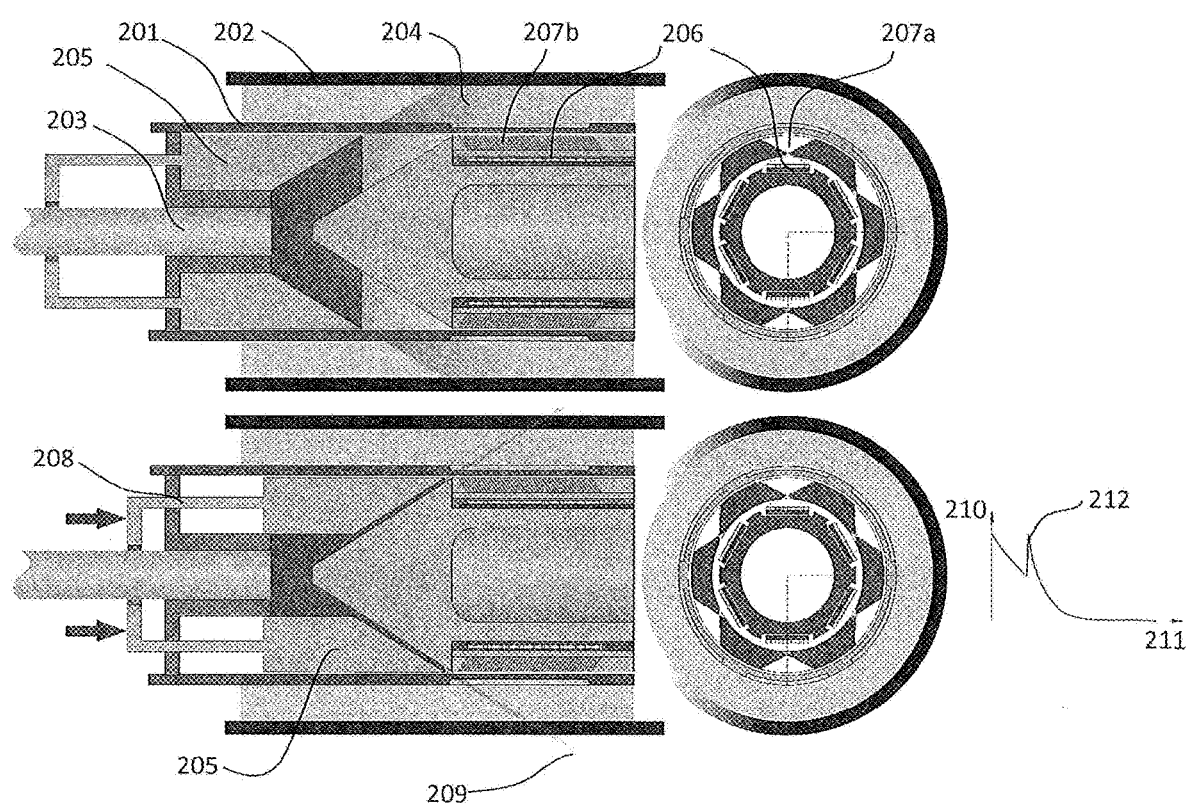
FIG. 2 illustrates an example embodiment of an x-ray-based tubing imaging and measurement tool, arranged so as to enable imaging of the inner-most casing or tubing, and illustrating the ability to change modes to perform a geometric measurement of the thickness of the tubing.
Figure 3:
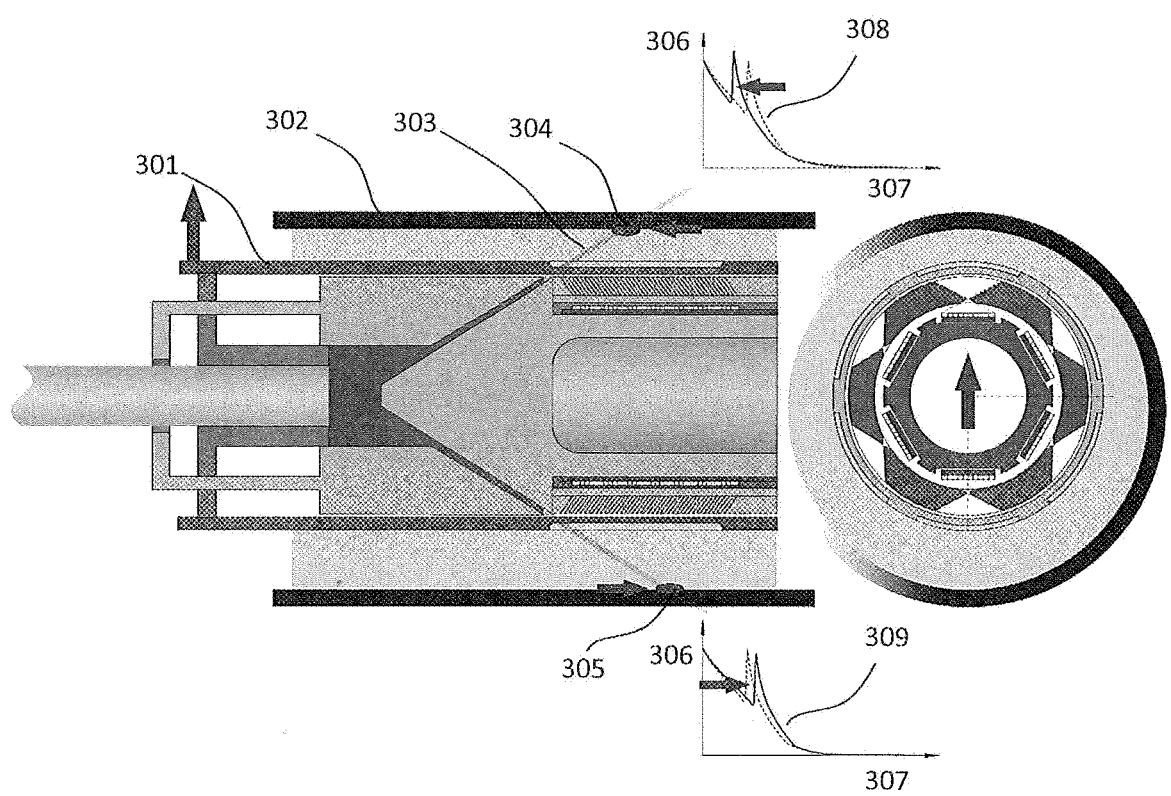
FIG. 3 illustrates an example embodiment of an x-ray-based tubing imaging and measurement tool, arranged so as to perform a geometric measurement of the thickness of the tubing, and in particular to determine the inner diameter and the outer diameter of the tubing.
Figure 4:
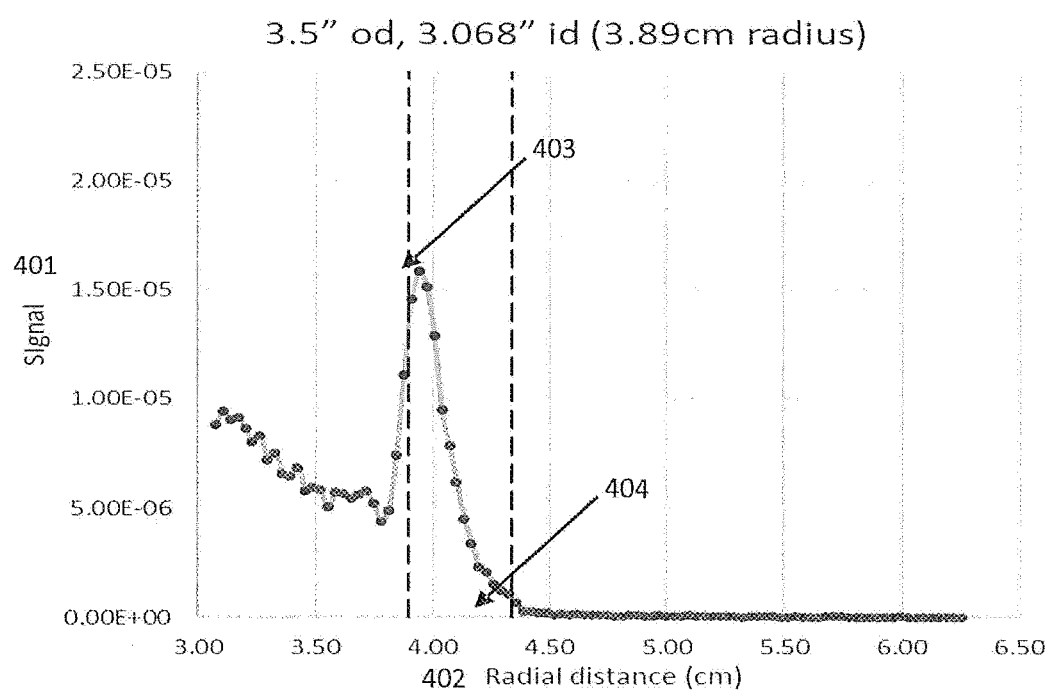
FIG. 4 illustrates how the intensity of detected x-rays can be translated directly into a geometric position within the tubing or casing, indicating the position of the inner diameter and the outer diameter.
Figure 5:
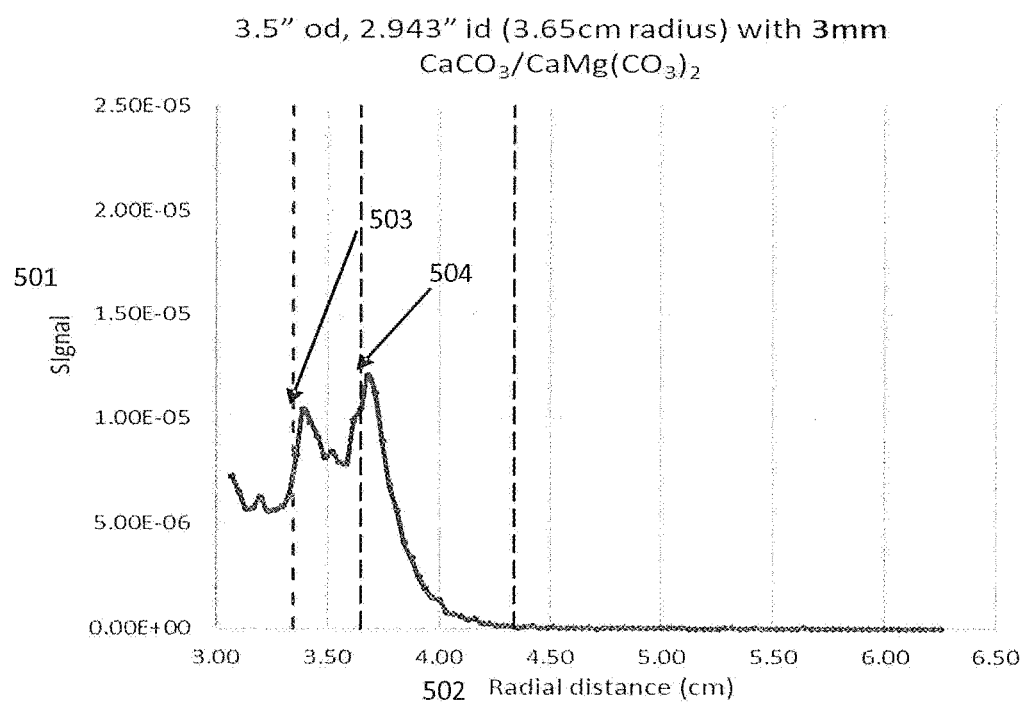
FIG. 5 illustrates how the intensity of detected x-rays can be translated directly into a geometric position within the tubing or casing, indicating the position of the inner diameter of scale, simultaneously with the inner diameter of the tubing and the outer diameter.

FIG. 2 illustrates an example embodiment in which a pressure housing [201] is conveyed through a well casing or tubing [202]. The pressure housing contains an electronic x-ray source [203] that is configured to produce x-rays panoramically in a conical output [204], the shape and distribution of said x-ray output is determined by the geometry of an actuatable source collimator [205, 208] which is formed by creating a non-blocking region of the radiation shielding. The conical x-ray beam [204] illuminates a cylindrical section of the casing/tubing [204]. The radiation scattering from the casing is imaged by an azimuthally arranged plurality of two-dimensional detector arrays [206], which are collocated with three-dimensional parallel hole collimators [207a, 207b]. The detector collimators reduce the field of view of each pixel of the detector array such that each pixel images a distinct and unique section of the illuminated casing/tubing. The collimators are formed such that, in the transverse direction, they form the geometry of a typical pinhole detector [207a], however, in the axial-radial direction they form the geometry of a plurality of parallel hole collimators [207b]. In a further embodiment, the source collimator may be actuated [208], by command of the operator without removing the tool from the borehole, such that one axial component of the collimator [205] moves to reduce the solid-angle of the source-output, resulting in a very narrow conical beam [209], or plurality of individual beams that create a conical form. The tool is then arranged so that the narrow conical beam intersects the tubing or casing and can be used to measure the thickness of the tubing or casing more precisely. As the axial offset for each pixel is known, along with the angle and field-of-view of the collimator, as well as the angle and divergence of the beam, it is simple to remap each pixel to a radially positioned voxel along the beam-path, the form of which may be plotted as intensity [210] versus axial or radial offset [211] to produce a backscatter profile [212] of the tubing or casing material.

In another example embodiment, the concentricity of the tool [101] compared to the tubing or casing [302] does not affect the geometric relation of the measurement with respect to the inner diameter and the outer diameter of the tubing or casing [302]. If the tool housing [301] standoff is reduced in the direction of the tubing or casing [302] then the conical x-ray beam [303] interacts with the tubing or casing [302] in a different position, such that the higher intensity region [304] of scattering photons being detected will appear to move toward the source anode position axially. On the opposite side of the tool (180 degrees away), the tool housing [301] standoff will be increased away from the tubing or casing [302] then the conical x-ray beam [303] will interact with the tubing or casing [302] in a different position, such that the higher intensity region [305] of scattering photons being detected will appear to move away from the source anode position axially. The result would be that the movement of the higher intensity region [304] when plotted as intensity [306] versus axial or radial offset [307] to form a profile [308] of the tubing or casing will shift but without changing the overall form of the tubing or casing profile, as the source beam angle will not have changed. Conversely, on the opposite side of the tool (180 degrees away) the result would be that the movement of the higher intensity region [305] when plotted as intensity [306] versus axial or radial offset [307] to form a profile [309] of the tubing or casing, will shift but without changing the overall form of the tubing or casing profile, as the source beam angle will not have changed. The change in position of the two profiles [308, 309] can be used to determine both the position of the tool within the tubing, and the diameter of the inner diameter of the tubing as a function of azimuth around the tool.

In a further embodiment the axial offset for each pixel is known, along with the angle and field-of-view of the collimator and the angle and divergence of the beam, it is simple to remap each pixel to a radially positioned voxel along the beam-path, the form of which may be plotted as intensity [402] versus axial or radial offset [402] to produce a backscatter profile of the tubing or casing material, the leading edge of the plot [403] is also co-located with the highest rate of change in intensity [401]. When the return falls to near zero backscatter intensity, the outer diameter [404] may also be determined.

In a further embodiment, the tool is then arranged such that the narrow conical beam intersects the tubing or casing and can be used to measure the thickness of the tubing or casing precisely, in addition to the thickness of scale deposits on the inner-diameter of the tubing/casino. As the axial offset for each pixel is known, along with the angle and field-of-view of the collimator, and the angle and divergence of the beam, it is simple to remap each pixel to a radially positioned voxel alone the beam-path. A plot of intensity [501] versus radial distance, derived from the geometric remapping of intensity as a function of detector pixel position relative to the source output [502] may be used to determine the position of the inner diameter of scale deposits [503] upon the inner diameter of the tubing or casing, and the inner diameter of the tubing or casing [504], in addition to the outer diameter of the tubing or casing.

In a further embodiment, the radial inspection detector assemblies are used to create images of sand-screens, as well as to aid inspection.

In a further embodiment, the radial inspection detector assemblies are used to create images of side pocket mandrels, and to aid inspection.

In a still further embodiment, the radial inspection detector assemblies are used to create images of perforations, and to aid inspection and to map and size perforations.

In a further embodiment still, the radial inspection detector assemblies are used to create images of frac-sleeves.

In another embodiment, as the tool is logged axially, each axial 'column' of pixels of the detector arrays are sampled so that each column will image a similar section of the casing/tubing that had been imaged by a neighboring section during the prior sample. Upon encoding the images with the known azimuthal capture position of the image section, the separate image pixel columns associated with each imaged 'slit' section of the casing/tubing are summated or averaged to produce a higher quality image within a single pass.

In a further embodiment, the operator interrupts conveyance of the tool and uses the azimuthally imaging detector assembly to continually sample the same images tubing/casing illuminated cylinder section, so that, the resulting data set can build/summate statistically to improve image quality.

In another embodiment, the backscatter images contain spectral information, so that a photo-electric or characteristic-energy measurement can be taken, and the imaged material analyzed for scale-build up or casing corrosion.

In a further embodiment, machine learning is employed to automatically analyze the spectral (photo electric or characteristic energy) content of the images and identify key features, such as corrosion, holes, cracks, scratches, and/or scale-buildup.

In a further embodiment, the per-pixel collimated imaging detector array is a single 'strip' array (i.e., one pixel wide azimuthally, and multiple pixels long axially), the imaging result would be a 'cylindrical' ribbon image. The tool is then moved axially (either by wireline-winch or with a stroker) and a new image set taken, so that a section of casing is imaged by stacking cylindrical ribbon images/logs.

In a further embodiment, machine learning is employed to automatically reformat (or re-tesselate) the resulting images as a function of depth and varying logging speeds or logging steps such that the finalized casing and/or cement image is accurately correlated for azimuthal direction and axial depth, by comparing with CCL, wireline run-in measurements, and/or other pressure/depth data.

The foregoing specification is provided only for illustrative purposes, and is not intended to describe all possible aspects of the present invention. While the invention has herein been shown and described in detail with respect to several exemplary embodiments, those of ordinary skill in the art will appreciate that minor changes to the description, and various other modifications, omissions and additions may also be made without departing from the spirit or scope thereof.

The invention claimed is:

1. An x-ray-based cased wellbore tubing and casing imaging tool, the tool comprising:
   a shield to define the output form of the produced x-rays;
   a two-dimensional per-pixel collimated imaging detector array;
   a parallel hole collimator format in one direction that is formed as a pinhole in another direction;
   sonde-dependent electronics; and
   a plurality of tool logic electronics and power supply units (PSUs),
   wherein machine learning is employed to automatically reformat or re-tesselate resulting images as a function of depth and varying logging speeds or logging steps.

2. The tool of claim 1, wherein the two-dimensional per-pixel collimated imaging detector array comprises a single strip array that is one pixel wide and multiple pixels long.

3. The tool of claim 1, wherein the tool is to generate images that contain spectral information to inform characteristics of any wellbore materials or debris.

4. The tool of claim 1, wherein the shield further comprises tungsten.

5. The tool of claim 1, wherein the tool is configured so as to permit through-wiring.

6. The tool of claim 1, wherein the tool is combinable with other measurement tools comprising one or more of acoustic or ultrasonic tools.

7. The tool of claim 1, wherein the tool is used to determine an inner diameter of a tubing or casing.

8. The tool of claim 1, wherein the tool is used to determine an outer diameter of a tubing or casing.

9. The tool of claim 1, wherein the tool is used to determine a distribution and inner diameter of a scale upon an inner diameter of a tubing or casing.

10. The tool of claim 1, wherein the tool is used to determine the position, distribution and area of perforations, within casings surrounding a cased wellbore.

11. The tool of claim 1, wherein the tool is used to determine the position and integrity of sand-screens, within casings surrounding a cased wellbore.

12. The tool of claim 1, wherein the tool is used to determine the position and integrity of gravel-packs, within casings surrounding a cased wellbore.

13. The tool of claim 1, wherein the tool is used to determine the position and integrity of side-pocket mandrels, within casings surrounding a cased wellbore.

14. A method of using an x-ray-based cased wellbore tubing and casing imaging tool, the method comprising:
   producing x-rays in a shaped output;
   measuring an intensity of backscatter x-rays returning from materials surrounding a wellbore;
   determining an inner and an outer diameter of tubing or casing from the backscatter x-rays;
   converting image data from imaging detectors into consolidated images of the tubing or casing; and
   employing machine learning to automatically reformat or re-tesselate the consolidated images as a function of depth and varying logging speeds or logging steps.

15. The method of claim 14, wherein the imaging detectors comprise a two-dimensional per-pixel collimated imaging detector array that is one pixel wide and multiple pixels long.

16. The method of claim 14, wherein the imaging detectors comprise two sets of two-dimensional per-pixel collimated imaging detector arrays.

17. The method of claim 14, wherein the imaging detectors comprise a plurality of two-dimensional per-pixel collimated imaging detector arrays.

18. The method of claim 14, wherein the consolidated images contain spectral information to inform of characteristics of any wellbore materials or debris.

19. The method of claim 14, wherein the tool is combinable with other measurement methods comprising one or more of acoustic or ultrasonic.

20. The method of claim 14, wherein the tool is used to determine an inner diameter of a tubing or casing.

21. The method of claim 14, wherein the tool is used to determine an outer diameter of a tubing or casing.

22. The method of claim 14, wherein the tool is used to determine the distribution and inner diameter of a scale upon the inner diameter of a tubing or casing.

23. The method of claim 14, wherein the tool is used to determine the position, distribution and area of perforations, within casings surrounding a cased wellbore.

24. The method of claim 14, wherein the tool is used to determine the position and integrity of sand-screens, within casings surrounding a cased wellbore.

25. The method of claim 14, wherein the tool is used to determine the position and integrity of gravel-packs, within casings surrounding a cased wellbore.

26. The method of claim 14, wherein the tool is used to determine the position and integrity of side-pocket mandrels, within casings surrounding a cased wellbore.

\* \* \* \* \*